Figure 1:
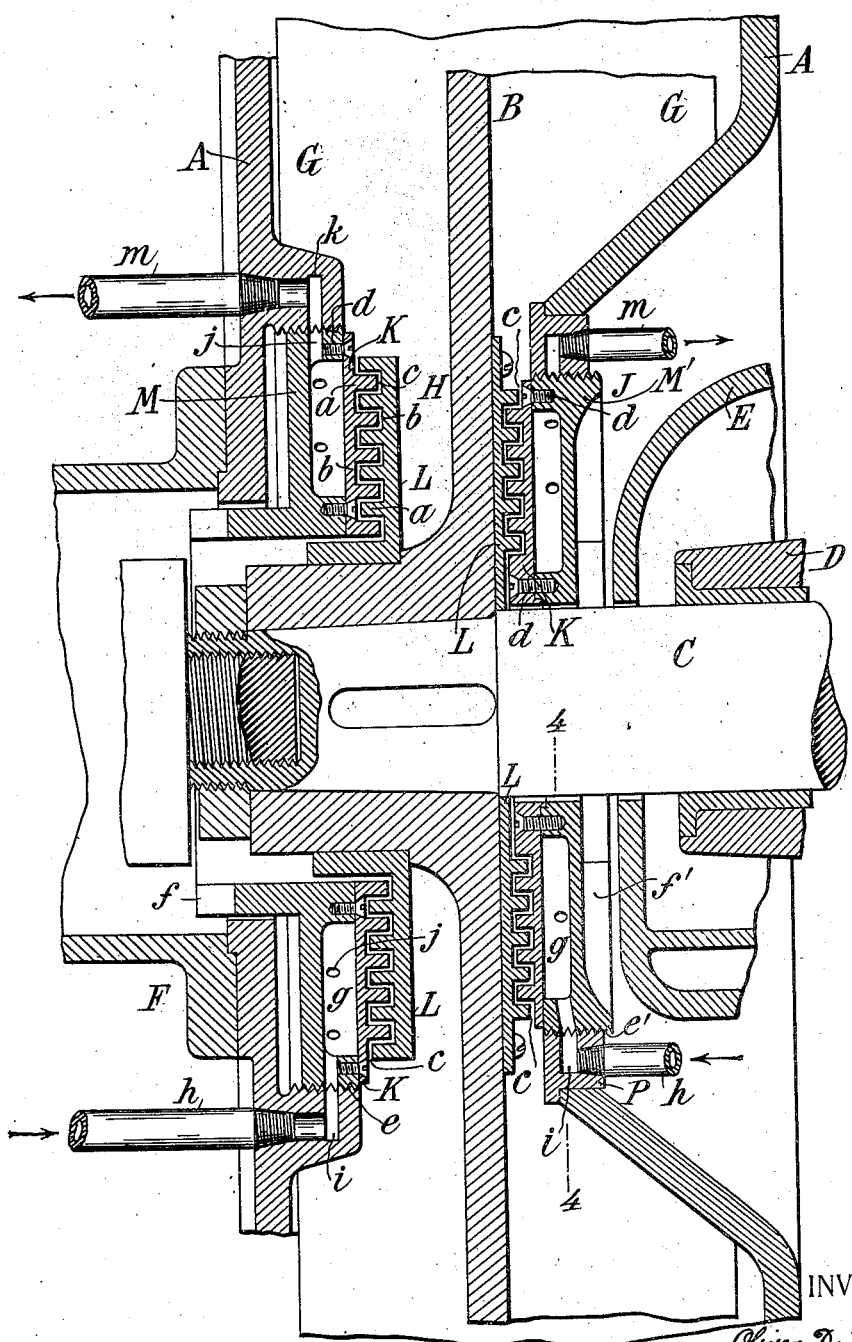

O. D. H. BENTLEY.
STEAM PACKING.
APPLICATION FILED APR. 22, 1909.

937,916.

Patented Oct. 26, 1909.
2 SHEETS—SHEET 1.

WITNESSES:

INVENTOR :
Oliver D. H. Bentley,
By Attorneys,

O. D. H. BENTLEY.
STEAM PACKING.
APPLICATION FILED APR. 22, 1909.

937,916.

Patented Oct. 26, 1909.
2 SHEETS—SHEET 2.

INVENTOR:
Oliver D. H. Bentley,
By Attorneys,

WITNESSES:

UNITED STATES PATENT OFFICE.

OLIVER D. H. BENTLEY, OF NEW YORK, N. Y., ASSIGNOR TO E. W. BLISS COMPANY, OF BROOKLYN, NEW YORK, A CORPORATION OF WEST VIRGINIA.

STEAM-PACKING.

937,916.

Specification of Letters Patent.   Patented Oct. 26, 1909.

Application filed April 22, 1909.   Serial No. 491,504.

*To all whom it may concern:*

Be it known that I, OLIVER D. H. BENTLEY, a citizen of the United States, residing in the borough of Brooklyn, county of Kings, city and State of New York, have invented certain new and useful Improvements in Steam-Packing, of which the following is a specification.

This invention relates to what are known as labyrinth packings, which are applicable to prevent leakage of steam under low pressure from between relatively moving surfaces which are slightly out of contact. Such packings are peculiarly suited to the requirements of steam turbine engines, although useful in other applications. It is characteristic of such a packing that the respective relatively moving parts are formed with concentric ribs and grooves, the ribs on each part fitting into the grooves in the other so as to form between them a very narrow space or passage through which the steam must flow in order to escape. This passage thus presents a frequent succession of angles by which it is rendered so tortuous that it is not inappropriately termed a "labyrinth". The relatively moving parts are ordinarily a stationary part or stator and a revolving part or rotor, although both parts might be revolving either at different speeds or in contrary directions. For convenience I will refer to them in this specification as a "stator" and "rotor" respectively. The relatively grooved surfaces should be so shaped as to recede from the axial center, being preferably of disk form, although they might be conical, so that in either case the successive ribs and grooves are formed inside of another, so that the general direction which must be traversed by the escaping steam is toward the center. The steam thus flowing centripetally through the labyrinthine passage has imparted to it, by the frictional engagement of the revolving surfaces constituting one side of this passage, a rotary movement, which as it accelerates with the inward progress of the steam, generates a centrifugal force sufficient to oppose and eventually to stop the inward circulation if the pressure impelling the steam be not excessive. The centrifugal effect is increased by the presence of watery vapor resulting from the partial condensation of the steam. The result is that under proper conditions the centripetal tendency of the steam and the centrifugal force applied to the steam and the condensation water, reach a state of equilibrium so that although the labyrinthine passage is constantly open no steam can escape through it.

Figure 2:
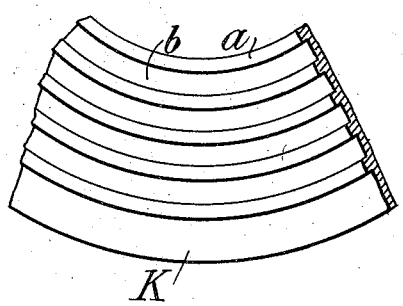
Figure 3:
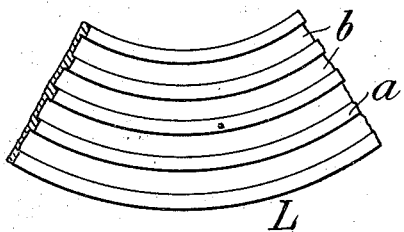
Figure 4:
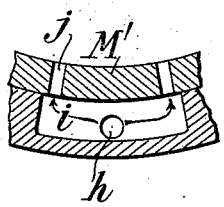
Figure 5:
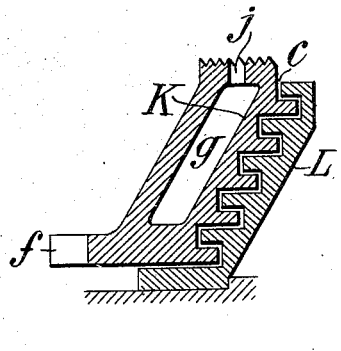
Figure 6:
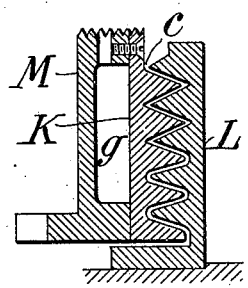

In the accompanying drawings Figure 1 is a diametrical longitudinal section of part of a steam turbine to which are applied two labyrinth packings constituting embodiments of my invention. Figs. 2 and 3 are fragmentary face views of the concentrically grooved disks forming the left hand packing shown in Fig. 1. Fig. 4 is a fragmentary section in the plane of the line 4—4 in Fig. 1 showing part of the other or right hand packing. Figs. 5 and 6 are fragmentary mid-sections of modified constructions of packings.

Referring to Fig. 1, let A designate the main casing of the turbine (which I will refer to as the "stator"), B the bucket wheel or rotor, C the revolving shaft, D part of one of the bearings for the shaft, E part of the bearing casing, and F part of the governor hood inclosing the governor. These parts require no description.

Within the casing or stator A is the steam chamber G which extends on both sides of the wheel or rotor B. It is to prevent the escape of steam from this chamber toward the shaft that the packings provided by my invention are applied. These packings as a whole are shown at H and J respectively.

Each packing comprises a stator part K and a rotor part L in which parts are formed the interfitting concentric ribs and grooves which constitute the labyrinth. The ribs are lettered *a* and the grooves between them *b*. The ribs are slightly narrower than the grooves in order that they may make a safe clearance during rotation and form the curved or approximately cylindrical portions of the labyrinthine passage. This passage or labyrinth as a whole is lettered *c*. The parts K and L are shown as disks, the former being fastened by screws *d* to a bushing M or M' seated in the stator or casing A; and the latter being carried by the rotor or shaft, preferably by being fastened in any suitable manner to the bucket wheel or rotor B. The construction is such that the labyrinthine passage between the disks K and L affords the only outlet for leakage of steam from the chamber G, it being understood that this chamber is in communication in the usual manner with the exhaust from the turbine.

The bushings M and M' are made adjustable in a direction parallel with the axis of rotation in order thereby to adjust the disks K toward or from the disks L. For this purpose the bushings are best mounted with a screw thread connection so that by turning them they may be displaced in axial direction. As shown the bushing M has a screw threaded engagement e with its seat in the casing A; and the bushing M' has a screw threaded engagement e' with a fixed bushing P which is seated in the casing. The respective bushings are provided with any convenient means by which they may be turned to effect the adjustment while the engine is running; as shown, the bushing M has notches f for receiving a spanner, and the bushing M' has notches f' for the like purpose, the spanners for the respective bushings being suitably shaped to reach and engage these notches.

The packing as thus far described is well adapted for locations where the steam to be confined is under very low pressure, as is ordinarily the case in the exhaust chamber of a steam turbine. The steam seeking to escape through the labyrinth encounters the rotor part or disk L which imparts to it a rotation which as the steam more deeply penetrates the labyrinth in its inward flow gradually increases, accompanied by an increasing centrifugal force which retards and checks the flow of steam and finally overcomes the pressure impelling it, so that at a point or zone somewhere within the labyrinth the flow of steam ceases. Thus at this point or zone, the location or diameter of which will vary from time to time or under varying conditions, an equilibrium exists between the pressure impelling the escape of the steam and the centrifugal force developed by the whirling steam. This retarding effect with a given rotative speed is developed with greater ease the narrower the labyrinthine passage is made and the greater the percentage of moisture in the steam which is confined in this passage.

The provision for relative adjustment of the grooved disks K L enables the width of the labyrinthine passage between them to be adjusted to a nicety. To effect this adjustment the stator disk is advanced while the rotor is running until it reaches actual contact with the rotor disk; it is then retracted very slightly, just enough to permit free running clearance. To avoid possibility of accident the adjusting threads e and e' of the respective bushings M M' are made respectively right and left hand in such relation to the direction of rotation of the rotor that the friction of accidental contact tends to unscrew the respective bushings and thereby increase the clearance between the disks and prevent the possibility of seizure.

With sufficiently minute passages in the labyrinths steam alone as a packing fluid is sufficient for most cases. But in case the pressure to be packed against is excessive,—as, for example, when the exhaust from the turbine is used for heating or for other purposes whereby a back pressure is developed,—it is necessary to add moisture to the steam which is confined within the packing. While this might be accomplished by introducing water into the labyrinth from the inner or smaller side, I prefer to provide the added moisture by chilling and thus partially condensing the steam itself by the introduction of a cooling fluid circulating through chambers or passages adjacent to the packing. For this purpose I provide each of the stator disks K with a water passage or jacket g which is most conveniently constructed by forming a suitable cavity in the bushing M or M', which cavity is closed by the application of the disk K thereto. Water is introduced through an inlet pipe h into an inlet chamber i, from which it passes through one or more holes j into the jacket g, and after circulating therethrough the water escapes on the diametrically opposite side through a similar hole j into a chamber k from which it passes off through an outlet pipe m. The chambers i and k are sufficienly large to insure communication with the jacket g through at least one of the holes k whatever may be the adjustment of the bushing M or M'. This will be apparent from Fig. 4 which shows the chamber i receiving water from the inlet opening h, and sufficiently wide to distribute it in the position shown through two of the holes j so that, as the bushing M' is turned, always at least one of these holes will communicate with this chamber. The chamber k is constructed and proportioned in like manner. The water thus circulated through the cooling jackets or chambers is controlled to cause condensation of sufficient steam so that the increased centrifugal effect resulting from the presence of this denser fluid in the labyrinth increases proportionately the resistance to the escape of the steam through the packing, and thereby enables the latter to pack against any back pressure or increased pressure which is likely to occur in a steam turbine. The efficiency of the packing in this respect may be controlled within practical limits by circulating more or less fluid through the cooling chambers, or by using a cooling fluid of higher or lower temperature as may be required. While water is preferable, other cooling fluids may be substituted.

While it is preferable to construct the concentrically ribbed and grooved parts forming the labyrinth as disks so as to secure the maximum centrifugal efficiency, in some locations it may be necessary or preferable to form them as cones, as shown for example in Fig. 5. While it is preferable to make the grooves and ribs with parallel sides, as shown in Fig. 1, the shape may be varied by making them pointed or rounded or of other contours, as may be found desirable in any particular case, examples of which are shown in Fig. 6.

While this invention is designed primarily as a steam packing and is chiefly useful for packing steam, yet it is not necessarily confined to that use, as in some instance it may be available for checking the escape of air, or other fluids through a rotative joint.

This invention is to be clearly distinguished from those labyrinth packings wherein the escape of the steam or other fluid being packed against is opposed by introducing into the packing or stuffing box a packing fluid of equal or higher pressure. The present invention avoids the necessity of any introduction of a packing fluid, and of the use of fans or other means for generating a fluid pressure to oppose leakage through the packing. The distinguishing novel feature of the present invention is the application of a concentric labyrinth one of the walls of which rotates, the outer circumference of the labyrinth being in communication with the fluid to be packed against, so that the centrifugal force of the whirling fluid in the labyrinth is utilized to oppose inward leakage of the outlying fluid.

I claim as my invention:

1. A steam packing for a rotary shaft comprising two parts, the one rotating with relation to the other, said parts having a succession of interfitting concentric ribs and grooves forming between them a narrow labyrinthine passage and said passage communicating at its outer circumference with the fluid to be packed against, whereby said passage is adapted to resist a leakage of fluid from its outer to its inner circumference by opposing the centrifugal force of the whirling fluid to the centripetal leakage tendency thereof.

2. The combination with a stationary steam casing and a rotary shaft projecting through said casing, of a packing for said shaft comprising stator and rotor parts, the latter turning with the shaft, said parts having a succession of interfitting concentric ribs and grooves forming between them a narrow labyrinthine passage, and said passage communicating at its outer circumference with the steam chamber in said casing, and at its inner circumference with the atmosphere, whereby said passage is adapted to resist a leakage of steam from said chamber toward its inner circumference by opposing the centrifugal force of the whirling fluid to the centripetal leakage tendency thereof.

3. A steam packing comprising two parts, the one rotating with relation to the other, having interfitting concentric ribs and grooves forming between them a labyrinthine passage, extending from the space to be packed inwardly, and adjusting means for relatively displacing said parts to vary the width of said passage.

4. A steam packing comprising stator and rotor parts, having respectively interfitting concentric ribs and grooves forming between them a labyrinthine passage, the stator part having a screw-threaded engagement with its support for varying the width of said passage.

5. A steam packing comprising in combination with stator and rotor packing disks having interfitting concentric ribs and grooves forming between them a labyrinthine passage, a bushing carrying the stator disk and having a screw-threaded engagement with the stator for varying the width of said passage.

6. The combination with a stator and rotor, the latter adapted to turn in only one direction, of a labyrinth packing of which the stator part has a screw-threaded engagement with the stator, the pitch of the screw threads thereof being in such direction relatively to the rotation of the rotor that the turning of the stator part in such direction will widen the labyrinthine passage.

7. A steam packing comprising two parts, the one rotating with relation to the other, having interfitting concentric ribs and grooves forming between them a labyrinthine passage, said passage communicating at its outer circumference with the steam space to be packed, and extending thence inwardly to oppose the centrifugal tendency of the whirling fluid to the leakage of steam, and means for cooling one of said parts to promote condensation of steam in said passage and thereby increase such centrifugal tendency.

8. A steam packing comprising two parts, the one rotating with relation to the other, having interfitting concentric ribs and grooves forming between them a labyrinthine passage, said passage communicating at its outer circumference with the steam space to be packed, and extending thence inwardly to oppose the centrifugal tendency of the whirling fluid to the leakage of steam, and means for cooling one of said parts comprising a cooling jacket, and means for circulating a cooling fluid therethrough to promote condensation of steam in said passage and thereby increase such centrifugal tendency.

9. A steam packing comprising two parts, the one rotating with relation to the other, having interfitting concentric ribs and grooves forming between them a labyrinthine passage, and a water-jacket adjacent to said grooves for cooling said passage.

10. A steam packing comprising stator and rotor parts having respectively interfitting concentric ribs and grooves forming between them a labyrinthine passage, a rotative bushing carrying said stator part formed with a cooling jacket and having a screw-threaded engagement with its support, and said support formed with inlet and outlet passages for cooling fluid communicating through the screw-threaded joint with said jacket.

In witness whereof, I have hereunto signed my name in the presence of two subscribing witnesses.

OLIVER D. H. BENTLEY.

Witnesses:
EDWIN C. KNAPP,
ARCHIE S. McLUNDIE.